United States Patent Office 3,636,026
Patented Jan. 18, 1972

3,636,026
BENZOIN-SILYL-ESTERS
Karl Fuhr, Hugo Vernaleken, and Hans-Georg Heine, Krefeld, Hans Rudolph, Krefeld-Bockum, and Hermann Schnell, Krefeld-Urdingen, Germany, assignors to Farbenfabriken Bayer Aktiengesellschaft, Leverkusen, Germany
No Drawing. Filed Oct. 20, 1969, Ser. No. 867,938
Claims priority, application Germany, Nov. 6, 1968, P 18 07 297.4
Int. Cl. C07f 7/06, 7/18
U.S. Cl. 260—448.8 R                    8 Claims

ABSTRACT OF THE DISCLOSURE

The invention relates to possibly α-substituted benzoin-silyl-esters which are useful photosensitisers for the photopolymerisation of polymerisable compounds or compound mixtures including mixtures of unsaturated polyesters and copolymerisable monomeric compounds.

The object of the invention are benzoin-solyl-esters of formula

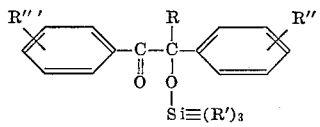

wherein R represents hydrogen, lower alkyl or alkenyl having 1 to about 4 C-atoms, aralkyl or phenyl, R' represents lower alkyl having 1 to about 4 C-atoms, preferably methyl, and R" and R''', which may be identical or different, represent hydrogen, halogen, lower alkyl having 1 to about 4 C-atoms, or methoxy.

Typical examples of such benzoin-silyl-esters are:

Benzoin-trimethylsolyl-ester boiling point$_{0.15}$ 118° C.: melting point 77° C.
α-Methylbenzoin-trimethylsilyl - ester—boiling point$_{0.03}$ 120° C.: melting point 32° C.
α-Ethylbenzoin - trimethylsilyl - ester—boiling point $_{0.04}$ 110–113° C.: $n_D^{20}$ 1.5377
α-Allylbenzoin-trimethylsilyl-ester—boiling point $_{0.01}$ 112–115° C.: $n_D^{20}$ 1.54.32
α-Phenylbenzoin - trimethylsilyl - ester—boiling point$_{0.02}$ 155–158° C.: melting point 43–44° C.
4,4' - dimethylbenzoin - trimethylsilyl - ester—boiling point$_{0.05}$ 140° C.: $n_D^{20}$ 1.5412
4,4' - dimethoxybenzoin - trimethylsilyl - ester—boiling point$_{0.05}$ 180° C.: $n_D^{20}$ 1.5598

A further object of the invention is the use of the new compounds as photosensitisers in the photopolymerisation of substances or substance mixtures which contain polymerisable double bonds.

A large number of sulphur-containing and halogen-containing compounds have been mentioned amongst others in the literature as compounds which initiate and accelerate photopolymerisations. Further substances which have been recommended are benzoin (U.S. patent specification 2,367,661) and some benzoin derivatives, such as certain α-substituted benzoins (U.S. patent specification 2,722,512) and benzoin-ethers of primary alcohols (U.S. patent specification 2,448,828 and French patent specification 1,450,589).

None of these compounds has been able to find industrial acceptance. As causes for this, there should be mentioned the excessively low reactivity and the inadequate storage stability in the dark of the polymerisable compounds mixed with these photosensitisers, but in part also the discolouration of the polymers, especially after prolonged storage in daylight.

Against this, the new compounds, in comparison to the hitherto known most reactive benzoin derivatives, such as benzoin-methyl-ether and benzoin-ethyl-ether, cause particularly slight discolourations in polymers when the polymers are exposed to daylight, for a prolonged period, and in part also possess excellent reactivity and storage stability in the dark.

The benzoin-alkylsilyl-esters are appropriately employed in amounts of from about 0.1 to about 5 percent by weight, preferably from about 0.5 to about 2.5 percent by weight, either individually or as a mixture with one another.

Suitable polymerisable compounds are all substances of which the carbon-carbon double bonds are activated by, for example, halogen atoms or carbonyl, cyanide, carboxyl, ester, amide, ether or aryl groups as well as carbon double bonds and carbon triple bonds. As examples there may be mentioned: styrene, vinyl toluene, divinyl benzene, vinyl acetate, vinyl chloride, vinylidene chloride, vinyl methyl ketone, acrylic and methacrylic acid, esters thereof such as the methyl, ethyl and allyl ester, their amides and nitriles, and other allyl esters, such as allyl acetate, phthalic acid diallyl ester and phosphoric acid triallyl ester, and mixtures of such compounds.

Moulding and coating compositions from mixtures, stabilised in the usual manner, of unsaturated polyesters and copolymerisable monomeric compounds can be used particularly advantageously, and here unsaturated polyesters are, as usual, to be understood as polycondensation products of α,β-unsaturated dicarboxylic acids such as maleic acid and fumaric acid, with polyols such as ethylene glycol and propanediol-1,2. A part of the unsaturated acids can be replaced by saturated acids, such as for example phthalic acid. Further modifications are possible through building-in monobasic acids and monohydric alcohols. So-called air-drying moulding compositions which apart from the radicals of α,β-unsaturated dicarboxylic acids also contain β,γ-unsaturated ether radicals, either as a constituent of the polyesters or as a constituent of further components of the mixture, can also be used.

By copolymerisable monomeric compounds, there are to be understood the unsaturated compounds which are customary in polyester technology having vinyl groups which are optionally substituted in the α-position or allyl groups substituted in the β-position, preferably styrene.

The photopolymerisable compounds or mixtures can be stabilised by the addition of usual inhibitors, for example hydroquinone, in the known amounts. Polymerisation catalysts, for example peroxides, can optionally also be conjointly employed in the usual amount. In conjunction with the use of ketone hydroperoxides, metal compounds, for example cobalt naphthenate, can be added for acceleration of complete cure. In this case the storage stability of the photopolymerisable compositions is admittedly lowered. It is therefore advisable when manufacturing lacquer coatings to work in accordance with the so-called active primer method in which the coating composition is applied to a peroxide-containing layer which is applied beforehand to the substrate.

It is particularly advantageous to employ the new benzoins in those coating compositions to which paraffin or wax or wax-like substances are added, which float to the surface at the start of the polymerisation and prevent the inhibiting action of atmospheric oxygen.

In order to protect light-sensitive substrates, for example light timbers, small amounts of customary ultraviolet absorbers can be added to the moulding and coating compositions without the reactivity being significantly impaired. Furthermore, small amounts of customary carriers and fillers as well as agents which confer thixotropy, such as glass fibres, synthetic fibres, silica and talcum, can be present during the photopolymerisation.

As radiation sources for carrying out the photopolymerisation it is possible to use natural sunlight or artificial radiators with an emission in the range of about 250 to about 500 m$\mu$, preferably from about 300 to about 400 m$\mu$. Mercury vapour lamps, xenon lamps and tungsten lamps are for example suitable. The compositions according to the invention also cure rapidly to colourless mouldings and coatings under the ultraviolet and visible radiation of low energy fluorescent lamps with an emission of rays of about 300 to about 580 m$\mu$.

When manufacturing mouldings from the sensitised compositions, it proves particularly advantageous that the compositions can be cured by appropriately metered irradiation without a significant heat effect, as a result of which larger mouldings can also be obtained free of cracks. In the absence of peroxides and metal accelerators the cure can optionally also be interrupted by placing the material in the dark and can be completed at any desired time after storage of the prepolymers thus obtained.

The new compounds can be manufactured in a manner which is in itself known by reaction of benzoins with substances which split off trialkylsilyl groups, for example trimethylsilyl chloride, hexamethyldisilazane and N-trimethylsilylacetamide, optionally in polar solvents such as pyridine, dimethylsulphoxide and dimethylformamide.

Benzoin-trimethylsilyl-ester can be manufactured in accordance with the following instruction: a solution of 50 g. of benzoin (0.236 mol) in 100 ml. of hexamethyldisilazane is heated for 1 hour to the boil with exclusion of moisture after the addition of 2 drops of concentrated sulphuric acid. During this time the sump temperature is 125° C. During the course of the reaction ammonia is split off. Thereafter the excess hexamethyldisilazane is distilled off under normal pressure and the remainder is distilled off in vacuo. A double distillation of benzoin-trimethylsilyl-ester follows in order to purify the crude product. The boiling point of the benzoin-trimethylsilyl-ester is boiling point$_{0.15}$ 118° C. and the yield is 55 g., equal to 81%.

$\alpha$-Methylbenzoin-trimethylsilyl-ester can for example be manufactured in accordance with the following instruction: a solution of 31.5 g. of $\alpha$-methylbenzoin (0.139 mol) in 190 ml. of hexamethyldisilazane is heated for 7 hours to the boil with exclusion of moisture, after addition of 2 drops of concentrated sulphuric acid. During this time the sump temperature is 125° C. Ammonia is split off during the course of the reaction.

Thereafter the excess hexamethyldisilazane is distilled off under normal pressure and the remainder is distilled off in vacuo. A distillation of the $\alpha$-methylbenzoin-trimethylsilyl-ester follows in order to purify the crude product. The boiling point of the $\alpha$-methylbenzoin-trimethylsilyl-ester is boiling point$_{0.03}$ 120–125° C. and the yield is 35.3 g., equal to 85%.

$\alpha$-Ethylbenzoin-trimethylsilyl-ester can for example be manufactured in accordance with the following instruction: a mixture of 4.60 g. of $\alpha$-ethylbenzoin (0.019 mol) and 3.67 g. of N-trimethylsilylacetamide is heated for 3 hours to 140° C. with exclusion of moisture. Thereafter the reaction mixture is cooled to room temperature and taken up in dry toluene, and the acetamide which is insoluble in toluene is filtered off. In order to isolate the $\alpha$-ethylbenzoin-trimethylsilyl-ester the toluene is distilled off at normal pressure and the remainder is distilled off in vacuo. A distillation of the $\alpha$-ethylbenzoin-trimethylsilyl-ester follows in order to purify the crude product. The boiling point of the $\alpha$-ethylbenzoin-trimethylsilyl-ester is at boiling point$_{0.04}$ 110–113° C. and the yield is 4.00 g., equal to 67%.

EXAMPLE 1

10 g. of extracted and freshly distilled acrylic acid methyl ester are mixed with 0.1 g. of two known sensitisers and one sensitiser according to the invention.

Illumination is carried out with a mercury vapour high pressure lamp (Philips HPK 125 W/L) through quartz glass in a waterbath at 24° C., at a distance of 10 cm. Here the solution of the sensitiser in the monomer is contained in a quartz glass of internal diameter 1.7 cm. under a nitrogen atmosphere. The time of illumination is 2½ minutes. Immediately after the illumination the quartz glass is introduced into an acetone/solid carbon dioxide mixture in order to prevent a thermal polymerisation. The solution of the polymer in the monomer and the solid polymer constituents which are present on the inside of the quartz glasses on the side facing the mercury vapour high pressure lamp are introduced into a small round flask by means of small quantities of a solvent (methylene chloride).

Thereafter unpolymerised monomeric constituents and the solvent are distilled off in a rotating evaporator. After drying in a vacuum drying cabinet to constant weight at 60° C., the amount of polymer is determined.

Table 1 contains a summary of the amounts of poly(acrylic acid methyl ester) obtained with various sensitisers.

TABLE 1

| Additives in percent by weight: | Amount of poly(acrylic acid methyl ester) in percent by weight |
|---|---|
| 1 benzoin | 16.5 |
| 1 benzoin-ethyl-ether | 24.4 |
| 1 benzoin-trimethylsilyl-ester | 28.2 |

If an initiator is not present, the amount of polymer is less than 0.1%.

EXAMPLE 2

An unsaturated polyester manufactured by condensation of 152 parts by weight of maleic anhydride, 141 parts by weight of phthalic anhydride and 195 parts by weight of propanediol-1,2 is mixed with 0.045 part by weight of hydroquinone and dissolved in styrene to give a 65 percent by weight solution.

2 parts by weight of two different known photosensitisers on the one hand and of three different photosensitisers according to the invention on the other hand are added to 100 parts by weight at a time of this form in which the resin is supplied and the mixture is stored with exclusion of light at 60° C. until it gels. Table 2 contains the sensitisers employed and the values of the storage stability at 60° C.

TABLE 2

Storage stability in the dark of the form in which a typical polyester resin is supplied, with an addition of 2 percent by weight of sensitiser.

| Sensitiser: | Storage stability at 60° C., days |
|---|---|
| Benzoin | <1 |
| Benzoin-ethyl-ether | <1 |
| $\alpha$-Methylbenzoin-trimethylsilyl-ester | >10 |
| $\alpha$-Ethylbenzoin-trimethylsilyl-ester | >10 |
| $\alpha$-Phenylbenzoin-trimethylsilyl-ester | >10 |

EXAMPLE 3

20 parts by weight of styrene, 1 part by weight of a 10 percent by weight solution of paraffin (melting point 52–53° C.) in toluene as well as, on the one hand, known photosensitisers and, on the other hand, photosensitisers according to the invention in equimolar amounts are mixed into 100 parts by weight at a time of the form in which the resin is supplied, described in Example 2. The solutions thus obtained are applied to glass plates by means of a film spreader (500μ) and illuminated with the radiation from a fluorescent lamp (Osram L 40 W/70–1) at a distance of 5 cm.

Table 3 contains the times for the paraffin to float to the surface and the times for reaching a pencil hardness >6H.

TABLE 3

| Sensitiser | Additive in parts by weight relative to form in which resin is supplied | Time for the paraffin to float to the surface, after minutes | Pencil hardness >6H, after minutes |
|---|---|---|---|
| Benzoin | 1.06 | 4.9 | 20.0 |
| α-Methylbenzoin | 1.13 | 1.9 | 16.0 |
| α-Phenylbenzoin | 1.44 | 1.6 | 16.0 |
| Benzoin-ethyl-ether | 1.20 | 0.9 | 6.0 |
| Benzoin-trimethylsilyl-ester | 1.42 | 1.3 | 8.0 |
| 4,4'-dimethylbenzoin trimethylsilyl-ester | 1.56 | 2.0 | 9.0 |
| 4,4'-dimethoxybenzoin-trimethylsilyl-ester | 1.72 | 3.4 | >30 |
| α-Methylbenzoin-trimethylsilyl-ester | 1.49 | 1.6 | 9.0 |
| α-Ethylbenzoin-trimethylsilyl-ester | 1.56 | 1.9 | 14.0 |
| α-Allylbenzoin-trimethylsilyl-ester | 1.62 | 1.0 | 12.0 |
| α-Phenylbenzoin-trimethylsilyl-ester | 1.80 | 1.7 | >30 |

In contrast to benzoin and benzoin-ethyl-ether the new compounds are distinguished by the fact that they give practically no cause for discolourations both during polymerisation and also on subsequent storage of the polymers under the influence of light.

EXAMPLE 4

100 parts by weight of the form in which the resin is supplied, described in Example 2, are mixed with 20 parts by weight of styrene, 1 part by weight of a 10 percent by weight solution of paraffin (melting point 52–53° C.) in toluene and 2 parts by weight of α-methylbenzoin-trimethylsilyl-ester and additionally with various peroxides, metal containing compounds and ultraviolet absorbers. 500μ thick layers of these solutions are applied to glass plates by means of a film spreader and exposed to the radiation of the fluorescent lamp described, at a distance of 5 cm. The times for the paraffin to float to the surface and the times until a pencil hardness >6H is reached are contained in Table 4.

TABLE 4

| Percent by weight | Additives, relative to form in which resin is supplied | Time for the paraffin to float to the surface, after minutes | Pencil hardness >6H, after minutes |
|---|---|---|---|
| 4 | Cyclohexanone peroxide (50% strength in plasticiser) | 1.3 | 12 |
| 4 | Methyl ethyl ketone peroxide (40% strength in plasticiser) | 1.4 | 13 |
| 2 | Cobalt naphthenate solution (20% strength in toluene) | 1.3 | 11 |
| 4 | Methyl ethyl ketone peroxide (40% strength in plasticiser) } | 3.5 | 28 |
| 2 | Cobalt naphthenate solution (20% strength in toluene) } | | |
| 0.05 | α-Cyano-α-(4-methoxyphenyl)-methacrylic acid butyl ester | 1.9 | 14 |

We claim:
1. Benzoin-silyl-esters of formula

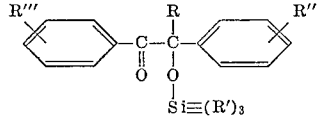

wherein R represents hydrogen, lower alkyl or alkenyl having 1 to about 4 C-atoms, aralkyl or phenyl, R' represents lower alkyl having 1 to about 4 C-atoms and R'' and R''', which may be identical or different, represent hydrogen, halogen, lower alkyl having 1 to about 4 C-atoms, or methoxy.

2. Benzoin-trimethylsilyl-ester.
3. α-Methylbenzoin-trimethylsilyl-ester.
4. α-Ethylbenzoin-trimethylsilyl-ester.
5. α-Allylbenzoin-trimethylsilyl-ester.
6. α-Phenylbenzoin-trimethylsilyl-ester.
7. 4,4'-dimethylbenzoin-trimethylsilyl-ester.
8. 4,4'-dimethoxybenzoin-trimethylsilyl-ester.

References Cited

UNITED STATES PATENTS

| 2,584,752 | 2/1952 | Speier | 260—448.8 R |
| 2,719,860 | 10/1955 | Morris et al. | 260—448.8 R |
| 2,730,532 | 1/1956 | Martin | 260—448.8 RX |

OTHER REFERENCES

Rochow, "Chemistry of the Silicones," 2nd ed., John Wiley and Sons, Inc., New York (1946), p. 17.

TOBIAS E. LEVOW, Primary Examiner

P. F. SHAVER, Assistant Examiner

U.S. Cl. X.R.

204—159.22, 162 R; 260—448.8 A